US012679301B1

(12) United States Patent
Treglown

(10) Patent No.: US 12,679,301 B1
(45) Date of Patent: Jul. 14, 2026

(54) KNEE AIRBAG FOR A VEHICLE

(71) Applicant: Autoliv ASP, Inc., Ogden, UT (US)

(72) Inventor: Aaron Treglown, Ogden, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 19/311,164

(22) Filed: Aug. 27, 2025

(51) Int. Cl.
B60R 21/231 (2011.01)
B60R 21/00 (2006.01)
B60R 21/2338 (2011.01)

(52) U.S. Cl.
CPC ........ B60R 21/231 (2013.01); B60R 21/2338 (2013.01); *B60R 2021/0051* (2013.01); *B60R 2021/23107* (2013.01); *B60R 2021/23169* (2013.01); *B60R 2021/23384* (2013.01)

(58) Field of Classification Search
CPC .............. B60R 21/231; B60R 21/2338; B60R 2021/0051; B60R 2021/23107; B60R 2021/23169; B60R 21/23; B60R 2021/23382
See application file for complete search history.

(56) References Cited

U.S. PATENT DOCUMENTS

| | | | |
|---|---|---|---|
| 6,382,662 | B1 | 5/2002 | Igawa |
| 7,222,877 | B2 * | 5/2007 | Wipasuramonton ........................ B60R 21/2338 280/730.2 |
| 7,434,837 | B2 | 10/2008 | Hotta et al. |
| 8,029,016 | B2 | 10/2011 | Moritani |

| | | | |
|---|---|---|---|
| 8,746,734 | B1 | 6/2014 | Smith et al. |
| 9,592,787 | B2 | 3/2017 | Jung et al. |
| 9,944,248 | B2 | 4/2018 | Rahman et al. |
| 12,049,186 | B1 * | 7/2024 | Treglown ............ B60R 21/2346 |
| 2005/0253367 | A1 | 11/2005 | Heigl |
| 2007/0145730 | A1 | 6/2007 | Choi |
| 2007/0222189 | A1 * | 9/2007 | Baumbach ............ B60R 21/231 280/743.2 |
| 2009/0085333 | A1 | 4/2009 | Imaeda et al. |
| 2010/0253051 | A1 | 10/2010 | Moritani |
| 2011/0095512 | A1 | 4/2011 | Mendez |
| 2014/0291972 | A1 | 10/2014 | Fukawatase et al. |

(Continued)

FOREIGN PATENT DOCUMENTS

| | | |
|---|---|---|
| CN | 114043959 A | 2/2022 |
| DE | 60305374 T2 | 5/2007 |

(Continued)

OTHER PUBLICATIONS

U.S. Appl. No. 18/372,728, filed Sep. 26, 2023.

(Continued)

*Primary Examiner* — Jason D Shanske
*Assistant Examiner* — Matthew Joseph Ganci
(74) *Attorney, Agent, or Firm* — Harness, Dickey & Pierce, PLC; Ryan W. Massey

(57) ABSTRACT

A knee airbag includes a front panel and a rear panel coupled to the front panel to define an inflation chamber. At least three transverse internal tethers are provided with alternating attachments between the front panel and the rear panel and within the inflation chamber. The at least three transverse internal tethers connected to the rear panel by rows of first attachment points extending in a lateral direction across the knee airbag and connected to the front panel by rows of second attachment points extending in the lateral direction.

16 Claims, 5 Drawing Sheets

(56)                    References Cited

U.S. PATENT DOCUMENTS

| | | |
|---|---|---|
| 2016/0002831 A1 | 1/2016 | Becker et al. |
| 2017/0136874 A1 | 5/2017 | Harris et al. |
| 2020/0276953 A1 | 9/2020 | Enders |
| 2022/0055568 A1 | 2/2022 | Ruffner, II et al. |
| 2022/0097642 A1 | 3/2022 | Albiez et al. |

FOREIGN PATENT DOCUMENTS

| | | |
|---|---|---|
| DE | 102016001918 A1 | 8/2017 |
| DE | 102019109901 A1 | 10/2020 |
| JP | 2005186886 A | 7/2005 |
| JP | 4954003 B2 | 6/2012 |
| WO | 2009054260 A1 | 4/2009 |
| WO | 2017140521 A1 | 8/2017 |
| WO | 2023066623 A1 | 4/2023 |
| WO | 2023/135263 A1 | 7/2023 |
| WO | 2024038040 A1 | 2/2024 |

OTHER PUBLICATIONS

ALBIEZ , Airbag With at Least Three Layers, Said Airbag Being Woven Into a Part, Apr. 27, 2023, EPO, WO 2023066623 A 1, Machine Translation of Description (Year: 2023).

\* cited by examiner

KNEE AIRBAG FOR A VEHICLE

FIELD

The present disclosure generally concerns inflatable occupant restraint systems for vehicles. More particularly, the present disclosure relates to a knee airbag arrangement for a vehicle.

BACKGROUND

This section provides background information related to the present disclosure which is not necessarily prior art.

Inflatable occupant restraints or airbags are commonly included on motor vehicles for passive occupant protection. Airbags used for frontal impact protection are generally installed in the vehicle steering wheel for the driver and behind the vehicle instrument panel for other front seat occupants. In addition to frontal impact protection, inflatable restraints are used for occupant protection from side impacts. For example, side curtain airbags are typically mounted along the roof rail of a vehicle and deploy in a downward direction to provide an energy absorbing structure between the head and upper torso of an occupant and the vehicle interior components.

In the event of an accident or impending accident, a sensor within the vehicle measures abnormal deceleration, for example, the airbag is triggered to inflate within a few milliseconds with gas produced by a device commonly referred to as an "inflator". The inflated airbag cushions the vehicle occupant from impact forces.

Inflatable occupant restraint systems may include a knee airbag arrangement for protecting the knees and/or lower legs of an occupant during a collision event. Such knee airbag arrangements generally include an inflatable knee airbag for absorbing at least a portion of the impact energy otherwise directed to an occupant's knees and lower legs during a collision event, especially by restraining the occupant by limiting forward movement of the knees and lower legs.

One suitable knee airbag arrangement is shown and described is commonly assigned U.S. Pat. No. 9,592,787 (the '787 patent). The '787 patent discloses a knee airbag arrangement having an inflatable cushion configured and arranged to rapidly deploy between the knees of a passenger and an instrument panel of the vehicle. The inflatable cushion of the knee airbag arrangement includes a front panel, a rear panel coupled to the front panel, and a hinge portion having a thin inflation section at a position corresponding to a housing connecting portion. The inflatable cushion is connected to a housing connection portion at the hinge portion upon inflation. The '787 patent is incorporated by reference as if fully set forth herein.

Another suitable air knee airbag arrangement is shown and described is commonly assigned U.S. Ser. No. 18/107,332, filed Feb. 8, 2023 (the '332 application). The '332 application discloses a knee airbag arrangement having a front panel, rear panel coupled to the front panel to define an inflation chamber, and an intermediate panel between the front panel and the rear panel and within the inflation chamber. The intermediate panel is connected to the front panel and the rear panel at various locations between a proximal end and a distal end of the intermediate panel to control an inflated configuration of the knee airbag. First and second suspension portions suspend the proximal end of the intermediate panel between the front panel and the rear panel and permeable to the passage of inflation gases. The first suspension portion extends between the front panel and the proximal end of the intermediate panel. The second suspension portion extends between the rear panel and the proximal end of the intermediate panel. An inflator for inflating the knee airbag is disposed in the inflation chamber at a proximal end of the knee airbag. An inflation gas diffusing arrangement is disposed in the inflation chamber between the inflator and the proximal end of the intermediate panel.

While known occupant restraint systems including a knee airbag arrangement such as the knee airbag arrangement shown and described in the '787 patent and the '332 application have proven to be suitable for their intended uses, a continuous need for improvement in the relevant art remains.

SUMMARY

This section provides a general summary of the disclosure, and is not a comprehensive disclosure of its full scope or all of its features.

In accordance with one particular aspect, the present teachings provide a knee airbag including a front panel, a rear panel and an intermediate panel. The rear panel is coupled to the front panel to define an inflation chamber. The intermediate panel is disposed between the front panel and the rear panel and within the inflation chamber. The intermediate panel is connected to the rear panel by rows of first attachment points extending in a lateral direction across the knee airbag and connected to the front panel by rows of second attachment points extending in the lateral direction. The intermediate panel defining at least three consecutive transverse tethers with alternating attachment offsets.

According to another aspect, an inflator is provided for inflating the knee airbag disposed in the inflation chamber at a proximal end of the knee airbag.

According to another aspect, the knee airbag includes a proximal bending area proximate a proximal end thereof.

According to another aspect, the proximal bending area includes 4 rows of first attachment locations and 2 rows of second attachment locations.

According to another aspect, a distance between consecutive offset transverse tether sets is larger than the adjacent transverse tether effective lengths.

According to another aspect, the at least three internal tethers with alternating attachments between the front panel and the rear panel are made from a single panel.

According to another aspect, a distance between adjacent first and second attachment points is the same as a tether effective length.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments, not all possible implementations, and are not intended to limit the scope of the present disclosure.

DETAILED DESCRIPTION

One or more example embodiments will now be described more fully with reference to the accompanying drawings. The one or more example embodiments are provided so that this disclosure will be thorough and will fully convey the scope to those who are skilled in the art. Numerous specific details are set forth, such as examples of specific components, devices, and methods, to provide a thorough understanding of embodiments of the present disclosure. It will be apparent to those skilled in the art that specific details need not be employed, and that the example embodiment should not be construed to limit the scope of the present disclosure. Well-known processes, well-known device structures, and well-known technologies are not described herein in detail.

The phrases "connected to", "coupled to" and "in communication with" refer to any form of interaction between two or more entities, including mechanical, electrical, magnetic, electromagnetic, fluid, and thermal interaction. Two components may be coupled to each other even though they are not in direct contact with each other. The term "adjacent" refers to items that are in close physical proximity with each other, although the items may not necessarily be in direct contact. The phrase "fluid communication" refers to two features that are connected such that a fluid within one feature is able to pass into the other feature. "Exemplary" as used herein means serving as a typical or representative example or instance and does not necessarily mean special or preferred.

In the following description, directional terms such as upper direction, lower direction, forward direction, rearward direction, and the like will be defined based on a knee airbag in a state that an associated airbag housing is coupled to a lower portion of an instrument panel. That is, a direction toward the roof of a vehicle is defined as an upper direction (U), a direction toward the bottom of the vehicle is defined as a lower direction (L), a direction toward a passenger is defined as a rearward direction (R), and a direction toward a front of the vehicle is defined as a forward direction (F). The terms distal and proximal used to describe the knee airbag or elements thereof shall be understood to be with reference to a deployed orientation of the knee airbag. Explaining further, the term distal refers to being at or toward the end of the knee airbag at the housing and the term proximal refers to being at or toward the end of the knee airbag opposite the housing.

Figure 1:
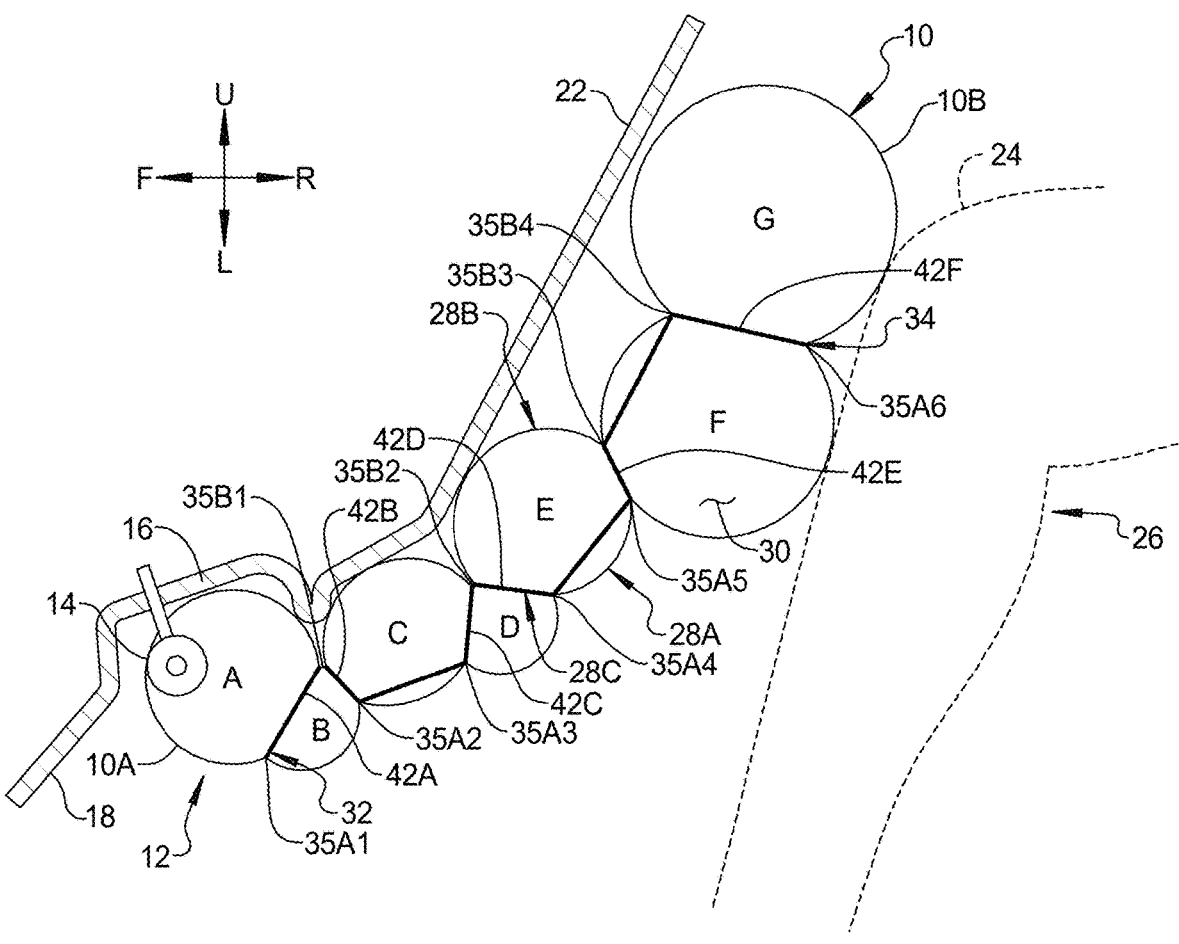
FIG. 1 is a schematic side view of a knee airbag for a vehicle in accordance with the present teachings, the knee airbag shown inflated and operatively disposed between the knees of a passenger and an instrument panel of the vehicle.
Figure 2:
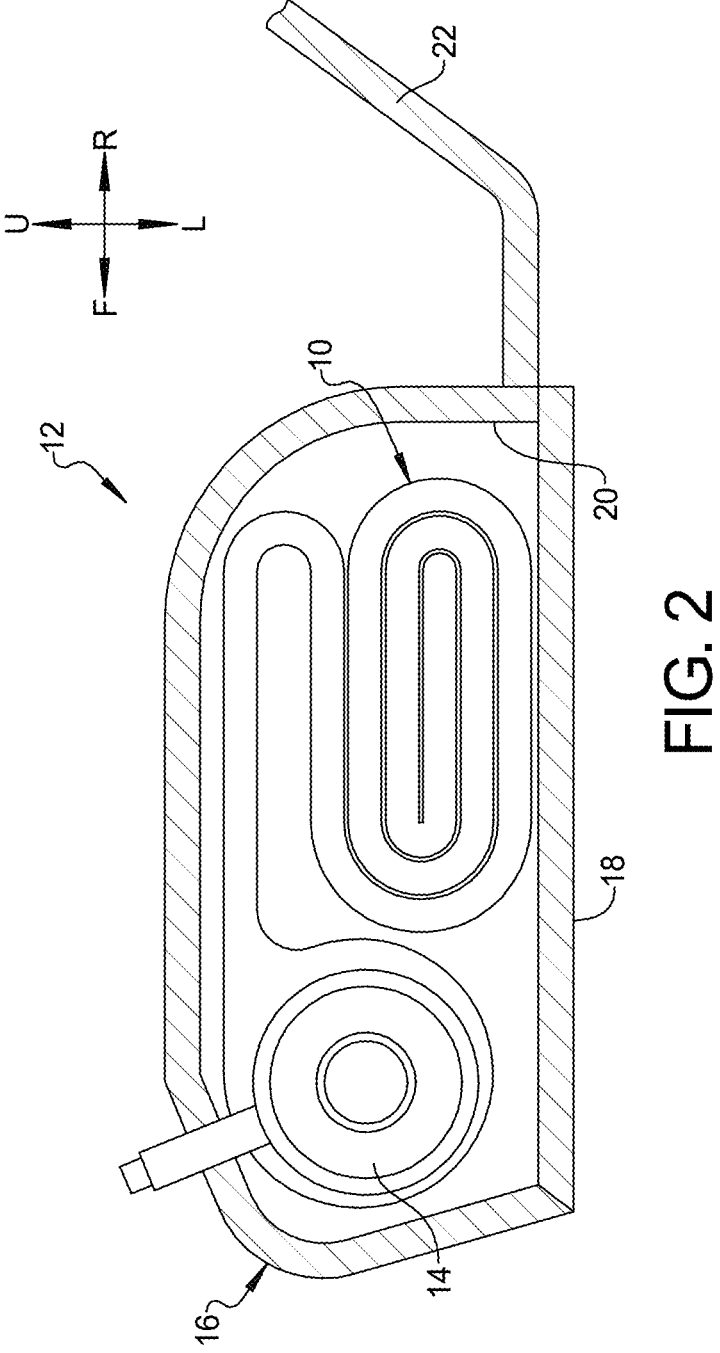
FIG. 2 is longitudinal cross-sectional view of the knee airbag of FIG. 1, the knee airbag shown prior to deployment within an airbag housing, and operatively associated with an inflator.

With particular reference to the environmental views of FIGS. 1 and 2, a knee airbag for a vehicle in accordance with the present teachings is illustrated and generally identified at reference character 10. The knee airbag 10, which is intended to be a generic representation of the various specific embodiments that will be described below, is shown incorporated into a knee airbag arrangement 12. The knee airbag arrangement 12 further includes an inflator 14 for supplying inflation gases to the knee airbag 10 upon sensing of predetermined collision events, and an airbag housing 16 receiving the knee airbag 10 and the inflator 14. The airbag housing 16 includes a door 18 normally covering an opening 20 of the airbag housing 16. The knee airbag arrangement 12 is installed within the vehicle at a lower portion of an instrument panel 22. Upon deployment, the knee airbag 10 is operatively disposed in a longitudinal direction (e.g., in a F to R direction) between the knees 24 of a passenger 26 and the instrument panel 22 of the vehicle.

With continued reference to the environmental views of FIGS. 1 and 2 and additional reference to FIGS. 3 through 6, the details of a first knee airbag 10 constructed in accordance with the present teachings will be further described. The knee airbag 10 extends between a proximal end 10A and a distal end 10B and is shown to generally include a first panel 28A, a second panel 28B and a third panel 28C. In the embodiment illustrated, the first panel is a rear panel 28A, the second panel is a front panel 28B, and the third panel is an intermediate panel 28C. As will become more clear below, the intermediate panel 28C cooperates with front and rear panels 28A and 28B to define a desired deployment shape of the knee airbag 10. As shown in the simplified cross-sectional view of FIG. 1, the intermediate panel 28C is disposed in the inflation chamber 30, extends at least substantially across the inflation chamber 30 in an airbag lateral direction, and at various locations between a proximal end 32 and a distal end 34 of the intermediate panel 28C is attached to both the rear panel 28A and the front panel 28B.

Figure 4:
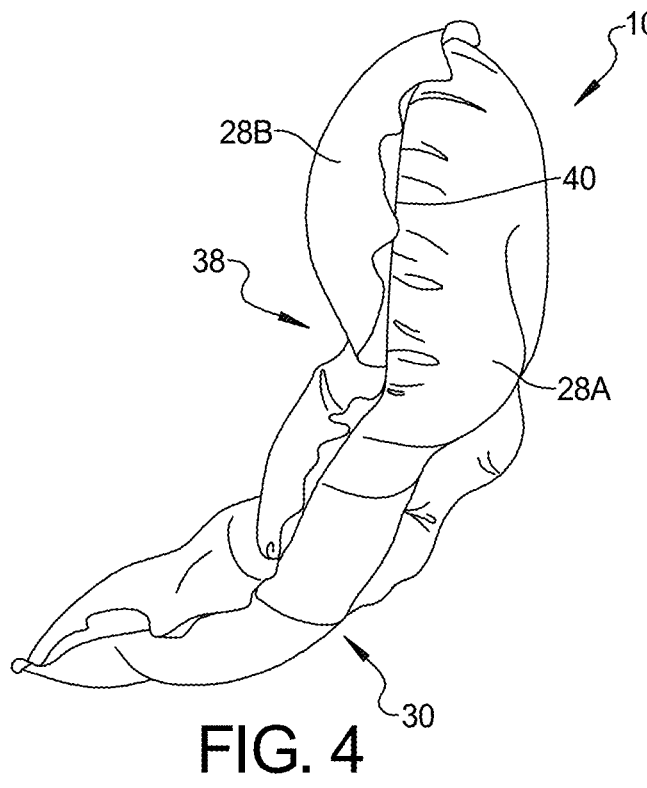
FIG. 4 is a side plan view of the knee airbag of FIG. 3 shown inflated.

When the rear and front panels 28A and 28B are internally connected with the intermediate panel 28C, a predetermined deployment profile or shape is defined. It will be understood that the particular deployment profile shown in the drawings and the corresponding attachment locations between the intermediate panel 28C and the rear panel 28A, and the corresponding attachment locations between the intermediate panel 28C and the front panel 28B may be modified or otherwise adapted within the scope of the present teachings. As shown in FIGS. 1 and 4, the particular attachment locations between the panels 28A-28C and the length difference between the rear panel 28A and the front panel 28B cooperate to define an airbag shape that unfolds and deploys between the knees 24 of the passenger 26 and the instrument panel 22 of the vehicle to protect the passenger 26.

Figure 3:
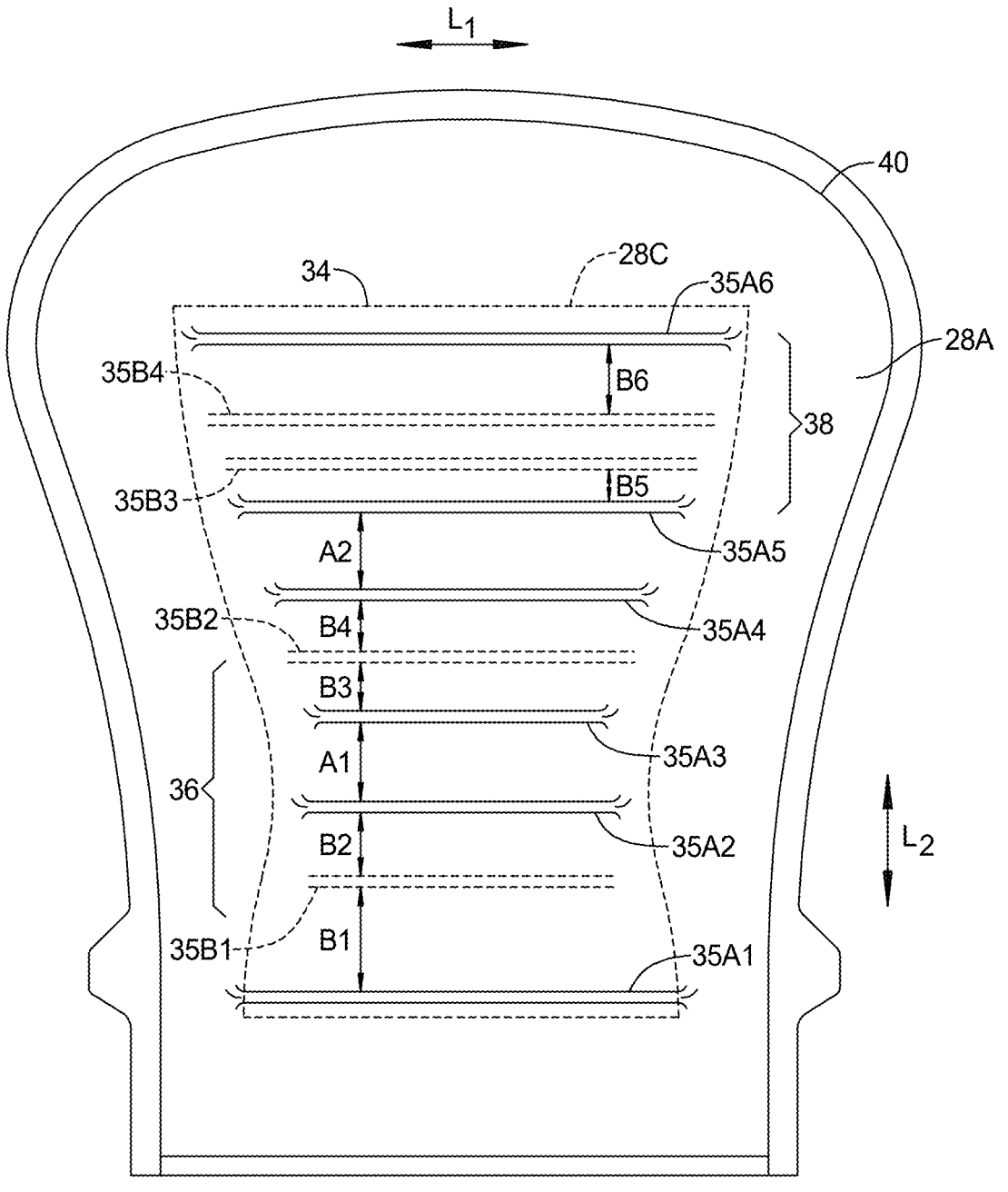
FIG. 3 is a rear view of a knee airbag constructed in accordance with the present teachings.
Figure 5:
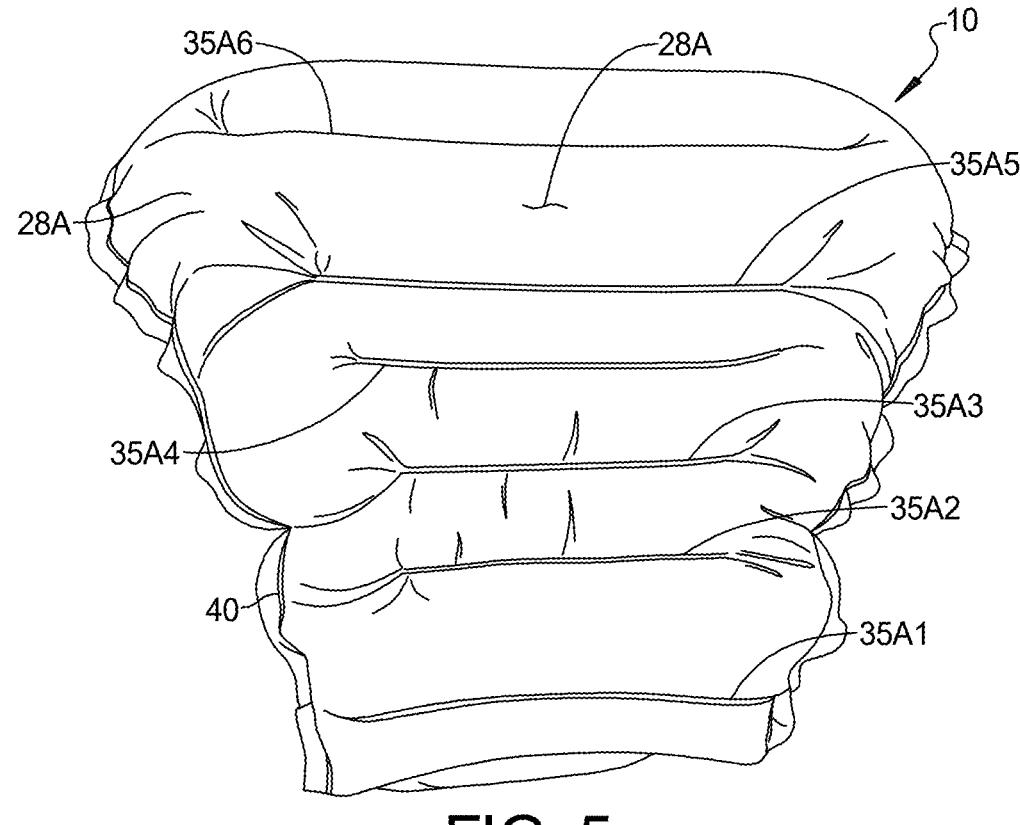
FIG. 5 is a rear view of the knee airbag constructed in accordance with the present teachings.
Figure 6:
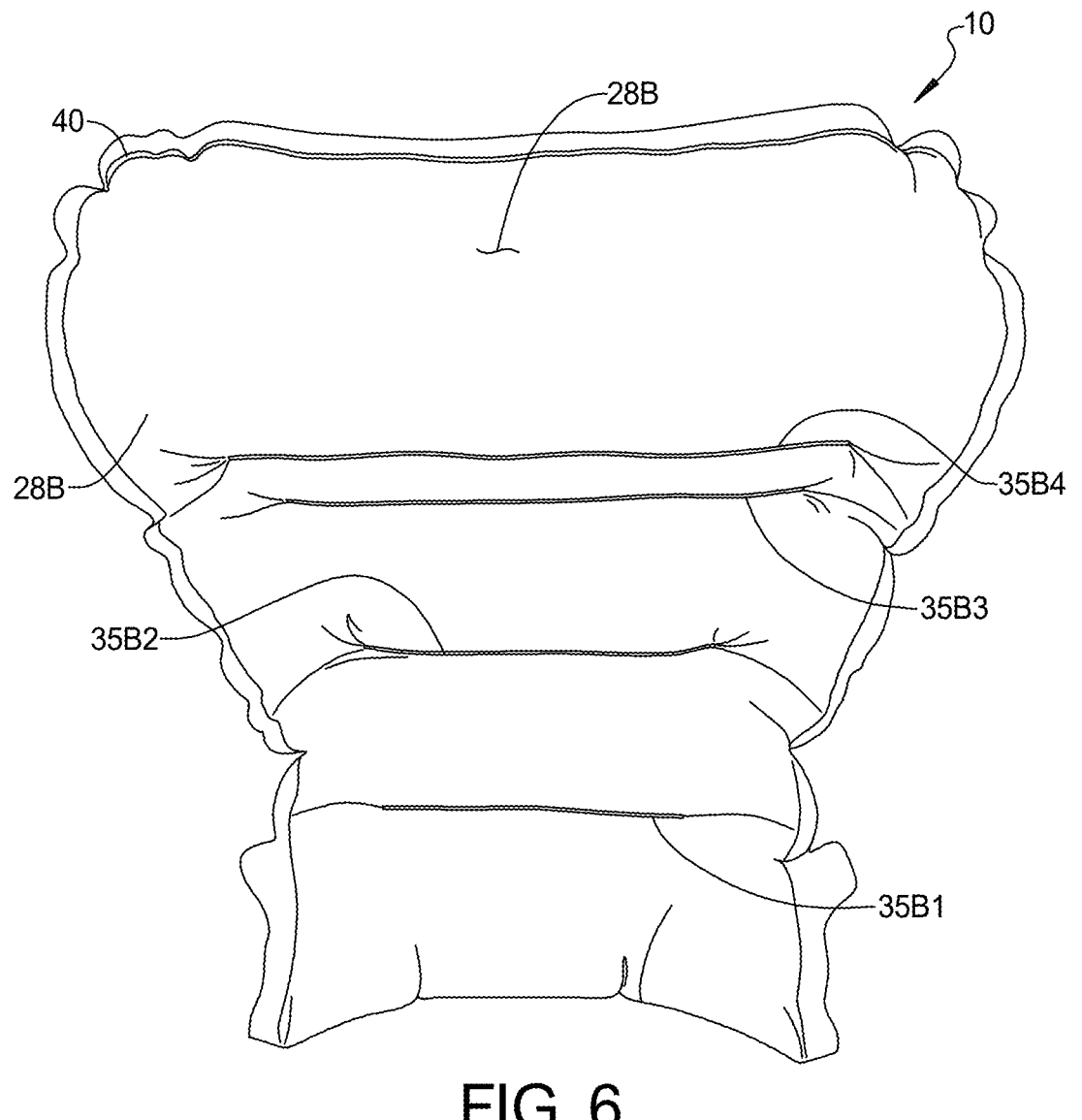
FIG. 6 is a front view of the knee airbag constructed in accordance with the present teachings.

As shown particularly in FIGS. 3 and 5-6 of the drawings, the attachment locations between the panels 28A-28C include first attachment locations 35A that connect the rear panel 28A and the intermediate panel 28C, and includes second attachment locations 35B that connect the front panel 28B and the intermediate panel 28C. The first attachment locations 35A1-35A6 (shown in solid lines in FIG. 3, for example) and the second attachment locations 35B1-35B4 (shown in dashed lines in FIG. 3, for example) are arranged in rows of first attachment locations 35A1-35A6 and rows of second attachment locations 35B1-35B4, respectively, extending in a lateral direction L1 laterally across the airbag 10. The rows of first attachment locations 35A1-35A6 and rows of second attachment locations 35B1-35B4 are spaced apart from one another in a longitudinal direction L2 of the airbag 10.

The rows of the first and second attachment locations 35A1-35A6 and 35B1-35B4 cooperate to define a proximal or lower bending area 36 of the airbag 10 and a distal or upper bending area 38 of the airbag 10. The proximal bending area 36 facilitates bending of the airbag closer to the proximal end 10A of the airbag 10 and the distal bending area 38 facilitates bending of the airbag 10 closer to the distal end 10B of the airbag 10.

Inflation gases from the inflator 14 pass between longitudinally adjacent attachment locations 35A1-35A6 and 35B1-35B4 and laterally between attachment locations 35A1-35A6 and 35B1-35B4 and an adjacent portion of a peripheral seam 40 (i.e., side flow openings of the airbag 10). In the airbag 10 of FIGS. 3-6, the attachment locations 35A1-35A6 and 35B1-35B4 contribute to an arrangement that provides a desired deployment trajectory and a desired inflation profile. The attachment location 35A1-35A6 and 35B1-35B4 also contribute to an arrangement that effectively diffuses inflation gases for fast and full inflation of the airbag 10.

In the embodiment illustrated, the rows of attachment locations 35A1-35A6 and 35B1-35B4 are arranged to define seven inflatable chambers A-G (as identified in the simplified side view of the airbag 10 of FIG. 1, for example). The relative size of these inflatable chambers A-g may be modified through alternate longitudinal spacings between adjacent rows of attachment locations 35A1-35A6 and 35B1-35B4. A degree of bending between adjacent inflatable chambers A-G may also be modified by alternate longitudinal spacings between adjacent rows of attachment locations 35A1-35A6 and 35B1-35B4.

In the embodiment illustrated, the proximal bending area 36 of the airbag 10 includes four rows of first attachment locations 35A1-35A4 and 2 rows of second attachment locations 35B1-35B2. The proximal most row is a first row of first attachment location 35A1. In a proximal to distal direction of the airbag 10, the proximal bending area 36 next includes a first row of second attachment locations 35B1 so that a first transverse tether 42A is formed. The first row of second attachment location 35B1 and a second row of first attachment locations 35A2 define a second transverse tether 42b. A third row of first attachment location 35A3 and a second row of second attachment location 35B2 define a third transverse tether 42C. The second row of second attachment location 35B2 and a fourth row of first attachment location 35A4 define a fourth transverse tether 42D. The first through fourth transverse tethers 42A-42D form the proximal bending area 36.

In the embodiment illustrated, the distal bending area 38 of the airbag 10 includes two rows of first attachment locations 35A5-35A6 and two rows of second attachment locations 35B3-35B4. A fifth transverse tether 42E is defined between a fifth row of first attachment location 35A5 and a third row of second attachment location 35B3. A fourth row of second attachment location 35B4 and a sixth row of first attachment location 35A6 define a sixth tether 42F. The fifth and sixth tethers 42E and 42F form the distal bending area 38.

In one particular application, the transverse tether sew spacing is the same as the tether 42A-42F effective lengths. This allows the tethers 42A-42F to be sewn flat. Although the tethers 42A-42F are shown formed from a single intermediate panel 28C, it should be understood that more than one intermediate panel can be used. According to a further aspect, a distance between consecutive offset tether sets A1, A2 is larger than the adjacent transverse tether effective lengths B1-B6.

In the embodiments illustrated and described herein, the knee airbags may be one piece woven (OPW) airbags. As such, the front panel 28A, the rear panel 28B and the intermediate panel 28C may be formed by weaving using OPW technology.

Deployment of the knee airbag 10 occurs in response to activation of the inflator 14. The inflator 14 activates in response to a sensed condition indicating a predetermined vehicle collision or event. The inflator 14, its activation, and the sensing of the vehicle collision or event will be understood to be conventional insofar as the present teachings are concerned. The inflator 14 delivers inflation gases to inflate the knee airbag 10.

While specific embodiments and applications of the present disclosure have been illustrated and described, it is to be understood that the invention is not limited to the precise configuration and components disclosed herein. Various modifications, changes, and variations, which will be apparent to those skilled in the art, may be made in the arrangement, operation, and details of the methods and systems of the present disclosure without departing from the spirit and scope of the disclosure. The various features of the present teachings may be used independently or in various combinations.

What is claimed is:

1. A knee airbag for a vehicle having a front end and a rear end comprising:
   a front panel configured to be deployed with an exterior surface facing the front end of the vehicle;
   a rear panel coupled to the front panel to define an inflation chamber, the rear panel configured to be deployed with an exterior surface facing the rear end of the vehicle; and
   an intermediate panel disposed between the front panel and the rear panel within the inflation chamber and the intermediate panel having a proximal end which during deployment is closest to the front end of the vehicle and is connected directly to the rear panel, the intermediate panel defining at least three transverse internal tethers with alternating attachments between the front panel and the rear panel and within the inflation chamber, the at least three transverse internal tethers connected to the rear panel by rows of first attachment points extending in a lateral direction across the knee airbag and connected to the front panel by rows of second attachment points extending in the lateral direction.

2. The knee airbag of claim 1, further comprising an inflator for inflating the knee airbag disposed in the inflation chamber at a proximal end of the knee airbag.

3. The knee airbag of claim 1, wherein the knee airbag includes a proximal bending area proximate a proximal end thereof.

4. The knee airbag of claim 3, wherein the proximal bending area includes 4 rows of first attachment locations and 2 rows of second attachment locations.

5. The knee airbag of claim 1, wherein a distance between consecutive offset transverse tether sets is larger than the adjacent transverse tether effective lengths.

6. The knee airbag of claim 1, wherein the at least three internal tethers with alternating attachments between the front panel and the rear panel are made from a single panel.

7. The knee airbag of claim 1, wherein a distance between adjacent first and second attachment points is the same as a tether effective length.

8. The knee airbag of claim 1, wherein the at least three transverse internal tethers of the intermediate panel includes six tethers including a first tether having a first connection of the proximal end of the intermediate panel to the rear panel at a first location and connected to a second connection to the front panel at a second location, a second tether connected to the front panel at the second location and to a third connection to the rear panel at a third location spaced from the first location, a third tether connected to the rear panel at a fourth location spaced from the third location and a fifth connection to the front panel at a fifth location spaced from the second location, a fourth tether connected to the front panel at the fifth location and to the rear panel at a sixth location spaced from the fourth location, a fifth tether connected to the rear panel at a seventh location spaced from the sixth location and to the front panel at an eighth location spaced from the fifth location and a sixth tether connected to the front panel at a ninth location spaced from the eighth location and to the front panel at a tenth location spaced from the seventh location.

9. A knee airbag for a vehicle having a front end and a rear end comprising:

a front panel configured to be deployed with an exterior surface facing the front end of the vehicle;

a rear panel coupled to the front panel to define an inflation chamber, the rear panel configured to be deployed with an exterior surface facing the rear end of the vehicle; and an intermediate panel disposed between the front panel and the rear panel within the inflation chamber and the intermediate panel having a proximal end which during deployment is closest to the front end of the vehicle and is connected directly to the rear panel, the intermediate panel including at least three transverse internal tethers with alternating attachments between the front panel and the rear panel and within the inflation chamber, the at least three transverse internal tethers connected to the rear panel by rows of first attachment points extending in a lateral direction across the knee airbag and connected to the front panel by rows of second attachment points extending in the lateral direction.

10. The knee airbag of claim 9, further comprising an inflator for inflating the knee airbag disposed in the inflation chamber at a proximal end of the knee airbag.

11. The knee airbag of claim 9, wherein the knee airbag includes a proximal bending area proximate a proximal end thereof.

12. The knee airbag of claim 11, wherein the proximal bending area includes 4 rows of first attachment locations and 2 rows of second attachment locations.

13. The knee airbag of claim 9, wherein a distance between consecutive offset transverse tether sets is larger than the adjacent transverse tether effective lengths.

14. The knee airbag of claim 9, wherein the at least three internal tethers with alternating attachments between the front panel and the rear panel are made from a single panel.

15. The knee airbag of claim 9, wherein a distance between adjacent first and second attachment points is the same as a tether effective length.

16. The knee airbag of claim 9, wherein the at least three transverse internal tethers of the intermediate panel includes six tethers including a first tether having a first connection of the proximal end of the intermediate panel to the rear panel at a first location and connected to a second connection to the front panel at a second location, a second tether connected to the front panel at the second location and to a third connection to the rear panel at a third location spaced from the first location, a third tether connected to the rear panel at a fourth location spaced from the third location and a fifth connection to the front panel at a fifth location spaced from the second location, a fourth tether connected to the front panel at the fifth location and to the rear panel at a sixth location spaced from the fourth location, a fifth tether connected to the rear panel at a seventh location spaced from the sixth location and to the front panel at an eighth location spaced from the fifth location and a sixth tether connected to the front panel at a ninth location spaced from the eighth location and to the front panel at a tenth location spaced from the seventh location.

* * * * *